United States Patent
Reed et al.

(10) Patent No.: US 10,462,981 B1
(45) Date of Patent: Nov. 5, 2019

(54) PLANTER POT DRAIN TRAY INCLUDING AN ELEVATED CENTRAL PEDESTAL, AN OBLIQUE LIQUID DRAIN AWAY, AND SUPPORT MEMBERS

(71) Applicant: Dune Farmers, LLC, Mapleton, OR (US)

(72) Inventors: Zeno Reed, Mapleton, OR (US); Brittany N Cowan, Mapleton, OR (US)

(73) Assignee: DRAIN AWAY LLC, Cda, ID (US)

( * ) Notice: Subject to any disclaimer, the term of this patent is extended or adjusted under 35 U.S.C. 154(b) by 336 days.

(21) Appl. No.: 15/617,247

(22) Filed: Jun. 8, 2017

Related U.S. Application Data

(60) Provisional application No. 62/349,317, filed on Jun. 13, 2016.

(51) Int. Cl.
    *A01G 9/04*     (2006.01)
    *A01G 27/00*     (2006.01)

(52) U.S. Cl.
    CPC .............. *A01G 9/04* (2013.01); *A01G 27/008* (2013.01)

(58) Field of Classification Search
    CPC .......... A01G 9/04; A01G 9/045; A01G 9/042; A01G 9/02
    See application file for complete search history.

(56) References Cited

U.S. PATENT DOCUMENTS

| | | | |
|---|---|---|---|
| 1,989,525 A | 1/1935 | Moore | |
| 2,770,957 A | 11/1956 | Bronson | |
| D231,416 S | 4/1974 | Goldring | |
| 3,949,524 A | 4/1976 | Mickelson | |
| 4,145,841 A * | 3/1979 | Woolpert | A01G 9/02 47/66.1 |
| 4,167,080 A | 9/1979 | Mickelson | |
| 4,860,491 A * | 8/1989 | Panuski | A01G 9/02 47/65.6 |
| D339,550 S | 9/1993 | Wilder | |
| 5,341,596 A * | 8/1994 | Kao | A01G 27/04 47/71 |

(Continued)

FOREIGN PATENT DOCUMENTS

| | | | | |
|---|---|---|---|---|
| DE | 1033946 B | * | 7/1958 | ............... A01G 9/02 |
| GB | 838888 A | * | 6/1960 | ............... A01G 9/02 |
| WO | WO-03079762 A1 | * | 10/2003 | ............... A01G 9/02 |

OTHER PUBLICATIONS

Planter Drain Off, http://planterdrainoff.com/, Mar. 8, 2016.

*Primary Examiner* — Magdalena Topolski
(74) *Attorney, Agent, or Firm* — Renaissance IP Law Group, LLP; David A. Crowther

(57) ABSTRACT

Embodiments include a planter pot drain tray having an elevated central pedestal member and an oblique liquid drain away member surrounding the elevated central pedestal member. The oblique liquid drain away member includes a high point at a first end of the planter pot drain tray and a low point at a second end of the planter pot drain tray. The planter pot drain tray includes a flanged outer rim coupled to an outer edge of the oblique liquid drain away member, and a drain spout member coupled to the flanged outer rim at the low point of the oblique liquid drain away member. The elevated central pedestal member, the oblique liquid drain away member, and the drain well permit the water runoff to be completely drained through the drain spout member. Multiple planter pot drain tray can be daisy-chained together.

19 Claims, 7 Drawing Sheets

(56) References Cited

U.S. PATENT DOCUMENTS

| | | |
|---|---|---|
| D351,220 S | 10/1994 | Barnes |
| D361,308 S | 8/1995 | Loran |
| 6,047,499 A | 4/2000 | Staas |
| D428,781 S | 8/2000 | Tanner |
| 6,510,653 B1 | 1/2003 | Workum et al. |
| D485,283 S | 1/2004 | Shuck |
| D488,402 S | 4/2004 | Fan |
| 7,690,150 B2 | 4/2010 | Orschulik |
| D632,607 S | 2/2011 | Gillingham |
| D677,763 S | 3/2013 | Laera |
| D720,447 S | 12/2014 | Korda |
| 9,010,021 B1 | 4/2015 | Robert |
| D732,421 S | 6/2015 | Cordova |
| D786,129 S | 5/2017 | Chan et al. |
| D787,368 S | 5/2017 | Meyers |
| 10,076,085 B2 * | 9/2018 | Holby .................... A01G 9/021 |
| 10,085,387 B2 * | 10/2018 | Takaoka ................ A01G 9/042 |
| 2002/0174599 A1 * | 11/2002 | Rose ........................ A01G 9/02 47/65.6 |
| 2004/0238438 A1 | 12/2004 | Chen |
| 2005/0050798 A1 * | 3/2005 | Eakin ....................... A01G 9/04 47/71 |
| 2005/0086863 A1 | 4/2005 | Brutsche et al. |
| 2006/0277825 A1 * | 12/2006 | Sanders .................. A01G 9/04 47/71 |
| 2009/0229180 A1 * | 9/2009 | Rich ...................... A01G 9/042 47/66.6 |
| 2013/0276369 A1 | 10/2013 | Hatcher |
| 2014/0090294 A1 * | 4/2014 | Vanwingerden ......... A01G 9/02 47/66.7 |
| 2016/0128282 A1 | 5/2016 | Halferty |
| 2016/0212944 A1 * | 7/2016 | Holby ...................... A01G 9/02 |

\* cited by examiner

PLANTER POT DRAIN TRAY INCLUDING AN ELEVATED CENTRAL PEDESTAL, AN OBLIQUE LIQUID DRAIN AWAY, AND SUPPORT MEMBERS

RELATED APPLICATION DATA

This application claims the benefit of U.S. Provisional Patent Application Ser. No. 62/349,317, filed on Jun. 13, 2016, the contents of which are hereby incorporated by reference.

FIELD

This application pertains to drain trays, and more particularly, to a planter pot drain tray including liquid drain away and support members.

BACKGROUND

Horticulture is a thriving part of modern civilization. Many kinds of plants are planted in planter pots. Planter pots hold soil and water so that the plants can be adequately nourished. Because some kinds of plants do not tolerate high water content in the soil, some planter pots have drain holes to drain some of the water content. Because water runoff can escape, planter pots are sometimes put on a tray. This can be done to avoid the water runoff causing damage, staining, safety hazards, or a mess to surrounding areas. But conventional trays can just cause the plants to sit in their own water runoff, which can be unhealthy for the plants. It is also inconvenient to empty a full tray of water, and with a conventional tray, such a task requires the potted plant to be removed from the tray, and the tray picked up and tipped over.

Accordingly, a need remains for an improved method and apparatus for automatically controlling the water runoff from a planter pot using a drain tray having liquid drain away and support members. Embodiments of the inventive concept address these and other limitations in the prior art.

The foregoing and other features of the inventive concept will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first cellular network could be termed a second cellular network, and, similarly, a second cellular network could be termed a first cellular network, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
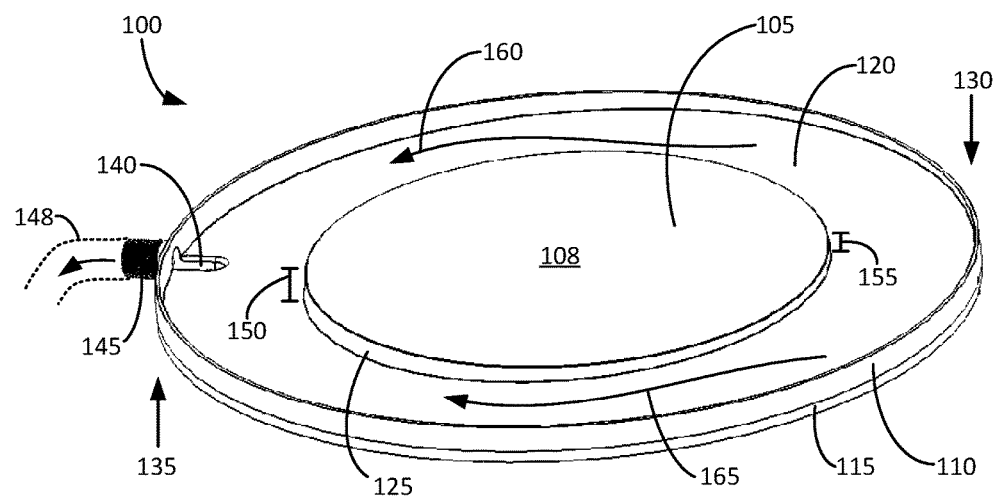
FIG. 1 illustrates an example perspective view showing an upper side of a planter pot drain tray in accordance with various embodiments of the present inventive concept.

FIG. 1 illustrates an example perspective view showing an upper side of a planter pot drain tray 100 in accordance with various embodiments of the present inventive concept. The planter pot drain tray 100 can include an elevated central pedestal member 105. In some embodiments, the elevated central pedestal member 105 has a planar upper surface. In some embodiments, the elevated central pedestal member 105 is substantially cylindrical. It will be understood that the elevated central pedestal member 105 can take other shapes such as a square or rectangle without departing from the inventive concept disclosed herein. The elevated central pedestal member 105 can include one or more sidewalls 125. The elevated central pedestal member 105 provides a raised central section to elevate a planter pot and associated plant (shown in FIG. 8) above a water drainage area (e.g., 160 and 165).

The sidewalls 125 can intersect with an oblique liquid drain away member 120. In some embodiments, the elevated central pedestal member 105 is disposed through the oblique liquid drain away member 120. In some embodiments, the oblique liquid drain away member 120 surrounds the elevated central pedestal member 105. The oblique liquid drain away member 120 can include a substantially planar surface that is sloped such that water runoff can follow the slope as shown, for example, at 160 and 165. The oblique liquid drain away member 120 can have a high-point at a first end 130 of the planter pot drain tray 100, and a low-point at a second end 135 of the planter pot drain tray 100. A sidewall 125 of the elevated central pedestal member 105 toward the first end 130 can have a first exposed height 155 above the oblique liquid drain away member 120. The sidewall 125 of the elevated central pedestal member 105 toward the second end 135 can have a second exposed height 150 above the oblique liquid drain away member 120. The second exposed height 150 above the oblique liquid drain away member 120 can be greater than the first exposed height 155 above the oblique liquid drain away member 120. The oblique liquid drain away member 120 can be orientated obliquely relative to an upper horizontal planar surface 108 of the elevated central pedestal member 105.

The planter pot drain tray 100 can include an upper flanged outer rim 110 and a lower flanged outer rim 115. It will be understood that in some embodiments, the planter pot drain tray 100 can include a single outer rim. It will be understood that reference is sometimes made to the upper flanged outer rim 110 herein, and such reference can sometimes refer to both of the upper flanged outer rim 110 and the lower flanged outer rim 115 collectively, or to a single outer rim. The upper flanged outer rim 110 contains the water runoff within the oblique liquid drain away member 120, and guides the water runoff in tandem with the oblique liquid drain away member 120 toward and out of a drain spout member 145. The drain spout member 145 can be coupled to the upper flanged outer rim 110. A drain well 140 can be disposed in or otherwise coupled to the oblique liquid drain away member 120 to further facilitate the drainage of all of the water runoff. The drain well 140 can be coupled to the drain spout member 145. The drain well 140 can cause the water runoff that congregates near the second end 135 of the planter pot drain tray 100 at the bottom area or lowest point of the oblique liquid drain away member 120, to travel into the drain spout member 145, away from the potted plant, and out of the planter pot drain tray 100. The elevated central pedestal member 105, the oblique liquid drain away member 120, and the drain well 140 permit the water runoff to be completely drained through the drain spout member 145. The upper flanged outer rim 110 and/or the lower flanged outer rim 115 may be coupled to the oblique liquid drain away member 120. It will be understood that the various parts of the planter pot drain tray 100 described herein can be individual parts that are coupled to each other. In an alternative embodiment, some or all of the various parts of the planter pot drain tray 100 described herein can be coupled to each other in the sense that they are contiguous parts from a single molded part.

In this manner, the planter pot drain tray 100 automatically guides the water runoff from a planter pot in a controlled manner Accordingly, the tray does not need to be manually tipped to be emptied. This enables the water runoff to be drained off of a deck or sidewalk in a predetermined direction, thereby preventing damage, staining, safety hazards, or a mess to surrounding areas. In some embodiments, a water conduit such as a pipe or hose 148 can be connected to the drain spout member 145 to extend the exit point of the water runoff. In some embodiments, the water conduit 148 can be coupled to the drain spout member 145 using a threaded pipe connector, such as a ¾ inch threaded pipe connector. The length of the water conduit 148 can be of any suitable length to reach where the user prefers the water runoff to go. In some embodiments, the water conduit 148 can direct the water runoff to other plants, thereby conserving water.

Figure 2:
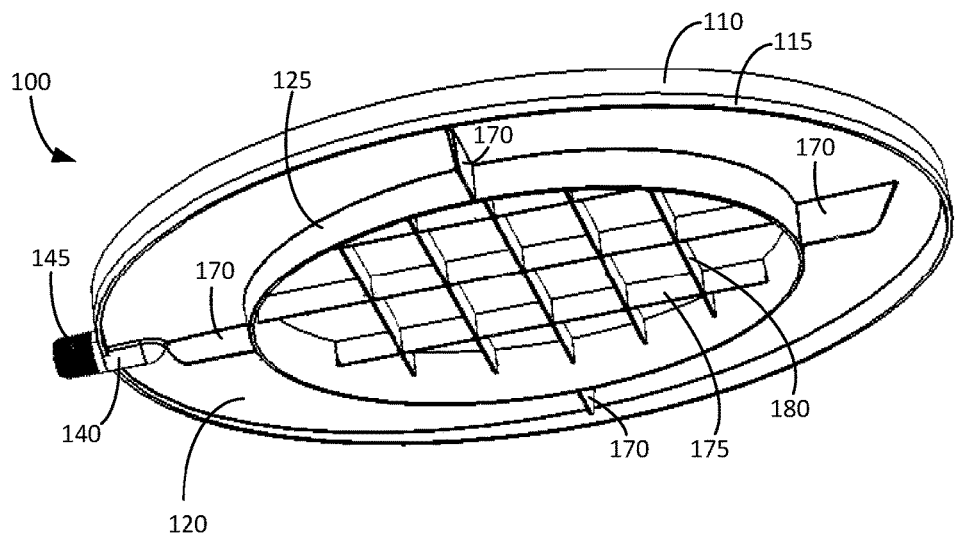
FIG. 2 illustrates an example perspective view showing a lower side of the planter pot drain tray of FIG. 1.

FIG. 2 illustrates an example perspective view showing a lower side of the planter pot drain tray 100 of FIG. 1. As can be seen in FIG. 2, the drain well 140 can form a channel from the oblique liquid drain away member 120 to the drain spout member 145 so that the water runoff can be automatically guided out of the planter pot drain tray 100. The sidewalls 125 of the elevated central pedestal member 105 can extend below edges of the upper flanged outer rim 110. External support fin members 170 can be coupled to the sidewalls 125 of the elevated central pedestal member 105, beneath the oblique liquid drain away member 120, and to a bottom surface of the oblique liquid drain away member 120. Each of the outside support fin members 170 can be of a different size to accommodate the sloped nature of the oblique liquid drain away member 120. Internal support beam members (e.g., 175 and 180) can be disposed inside the elevated central pedestal member 105 and coupled to a bottom surface of the elevated central pedestal member 105. The internal support beam members 175 can be arranged perpendicular to the internal support beams members 180. Moreover, the internal support beam members 175 can intersect the internal support beam members 180.

Figure 3:
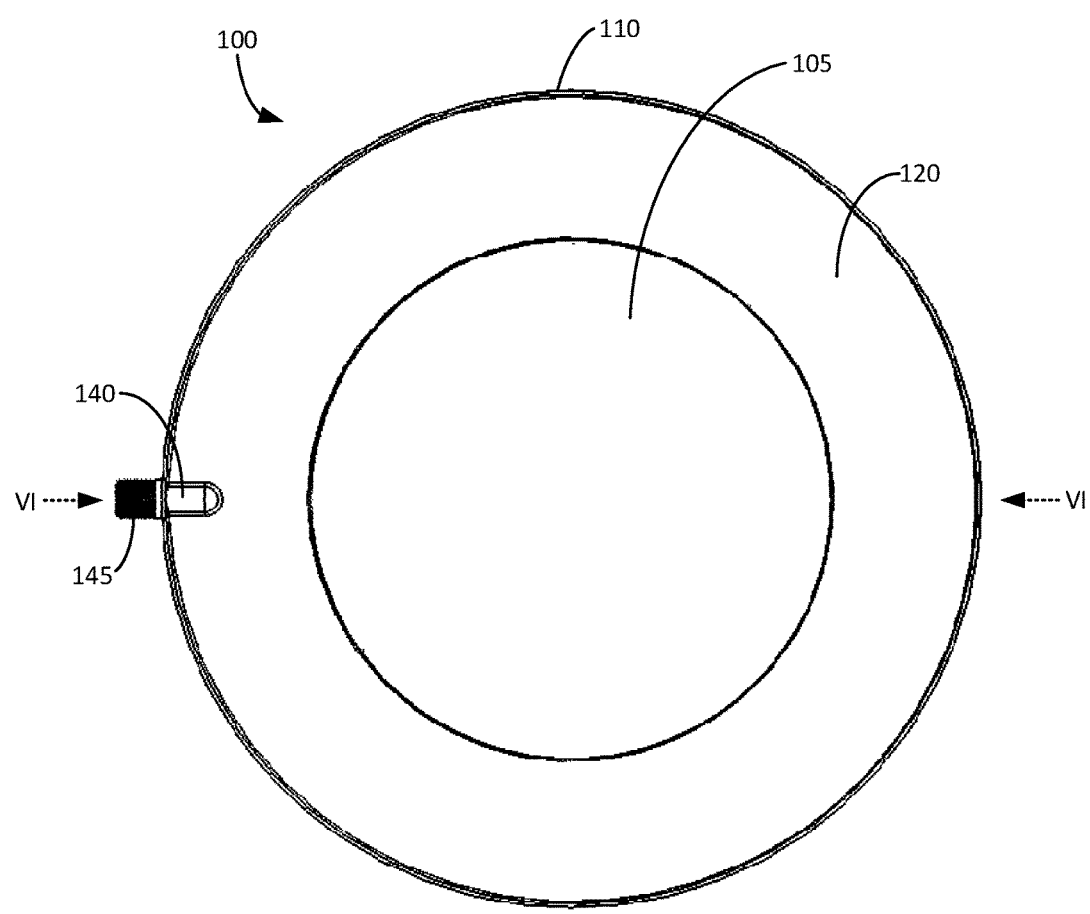
FIG. 3 illustrates an example top view of the planter pot drain tray of FIG. 1.
Figure 4:
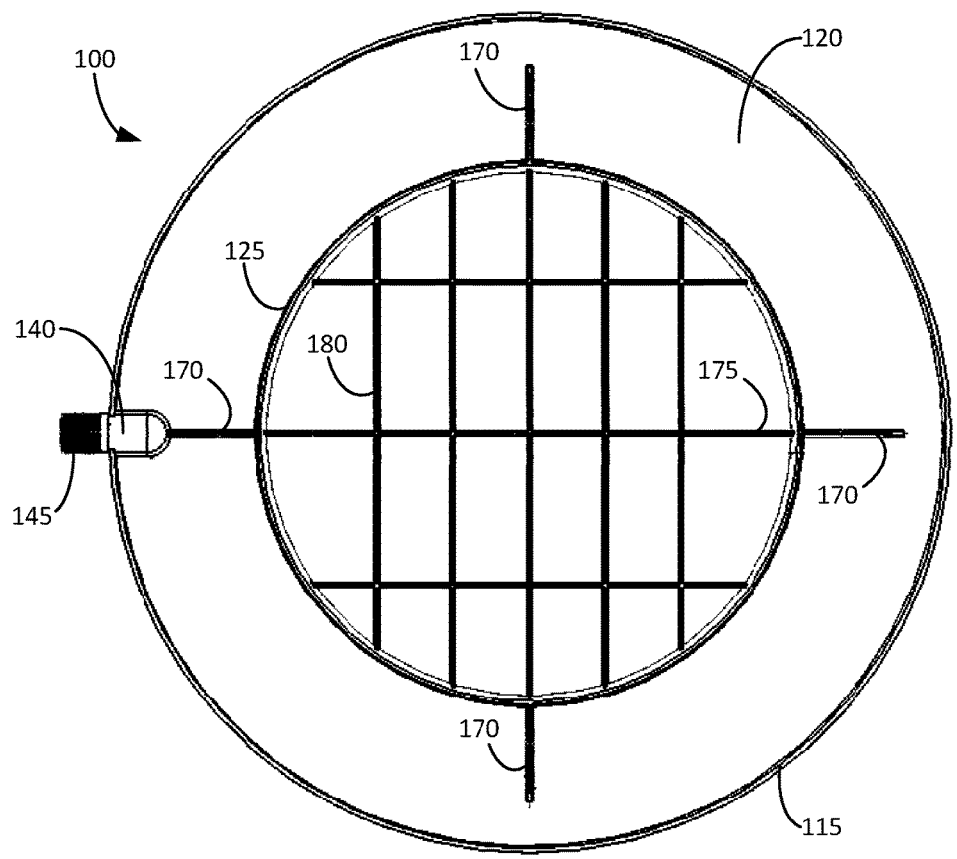
FIG. 4 illustrates an example bottom view of the planter pot drain tray of FIG. 1.

FIG. 3 illustrates an example top view of the planter pot drain tray of FIG. 1. FIG. 4 illustrates an example bottom view of the planter pot drain tray 100 of FIG. 1. The top and bottom views of the planter pot drain tray 100 show the connections of the various components and members in further detail. The various components and members of the planter pot drain tray 100 are described in detail above, and therefore, a detailed description is not repeated.

Figure 5:
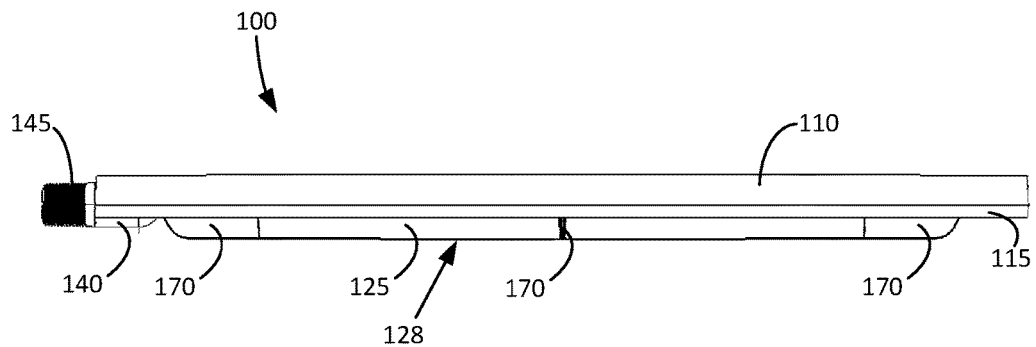
FIG. 5 illustrates an example side elevation view of the planter pot drain tray of FIG. 1.

FIG. 5 illustrates an example side elevation view of the planter pot drain tray 100 of FIG. 1. As shown in FIG. 5, the support fin members 170 can be made flush with a bottom edge 128 of the sidewalls 125 of the central pedestal member 105. The support fin members 170 and the sidewalls 125 of the central pedestal member 105 extend below the upper flanged outer rim 110 and the lower flanged outer rim 115, and are designed to be placed on and make contact with a level surface such as the ground. The drain well 140 extends slightly below the lower flanged outer rim 115, but above the ground level. The diameter of the drain spout member 145 is less than a distance between an upper edge of the upper flanged outer rim 110 and a lower edge of the drain well 140. The support fin members 170 can be coupled to a bottom surface of the oblique liquid drain away member 120, and to the one or more sidewalls 125.

Figure 6:
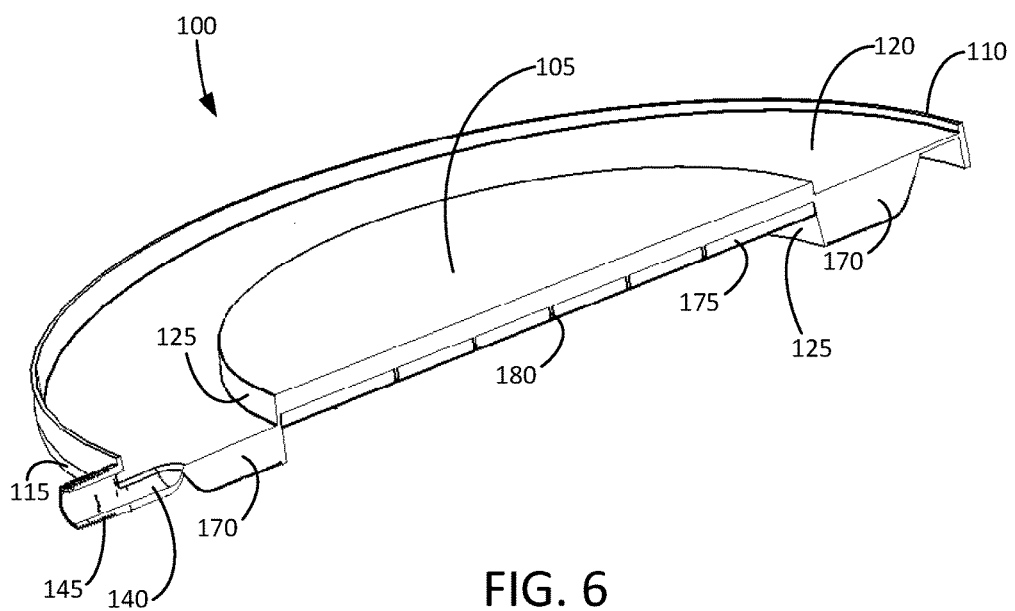
FIG. 6 illustrates an example cross-sectional perspective view taken along lines VI-VI of the planter pot drain tray of FIG. 3.
Figure 7:
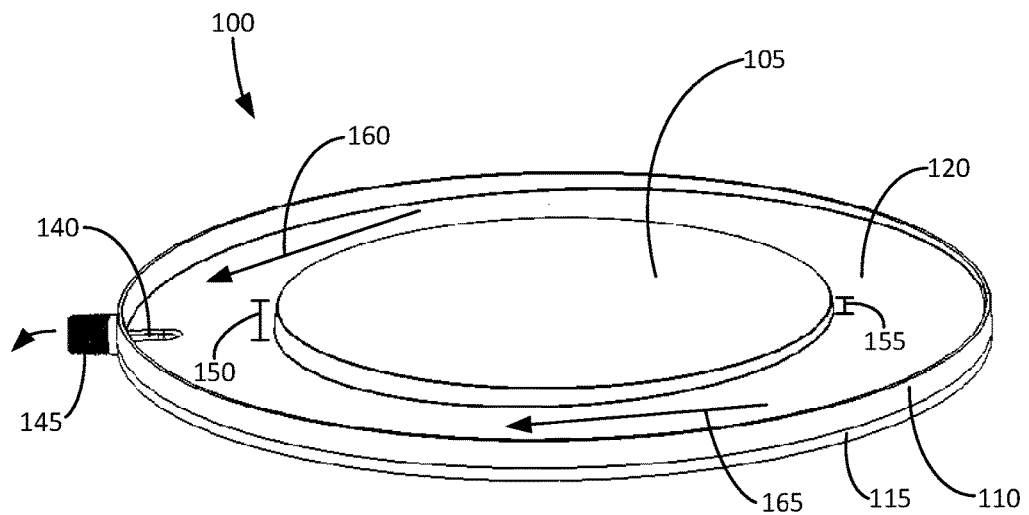
FIG. 7 illustrates another example perspective view showing an upper side of a planter pot drain tray in accordance with various embodiments of the present inventive concept.

FIG. 6 illustrates an example cross-sectional perspective view taken along lines VI-VI of the planter pot drain tray 100 of FIG. 3. FIG. 7 illustrates another example perspective view showing an upper side of a planter pot drain tray in accordance with various embodiments of the present inventive concept. Reference is now made to FIGS. 6 and 7. Some references numerals of some components are described above, and therefore, a detailed description of such components is not necessarily repeated.

As shown in FIG. 6, the external support fin members 170 can be formed contiguously with the oblique liquid drain away member 120 and the elevated central pedestal member 105. The internal support beam members (e.g., 175 and 180) can be formed contiguously within the central pedestal member 105. As shown in FIG. 7, the sloped oblique liquid drain away member 120 and the central pedestal member 105 are configured to guide water runoff to the drain well 140 and out of the drain spout member 145.

Figure 8:
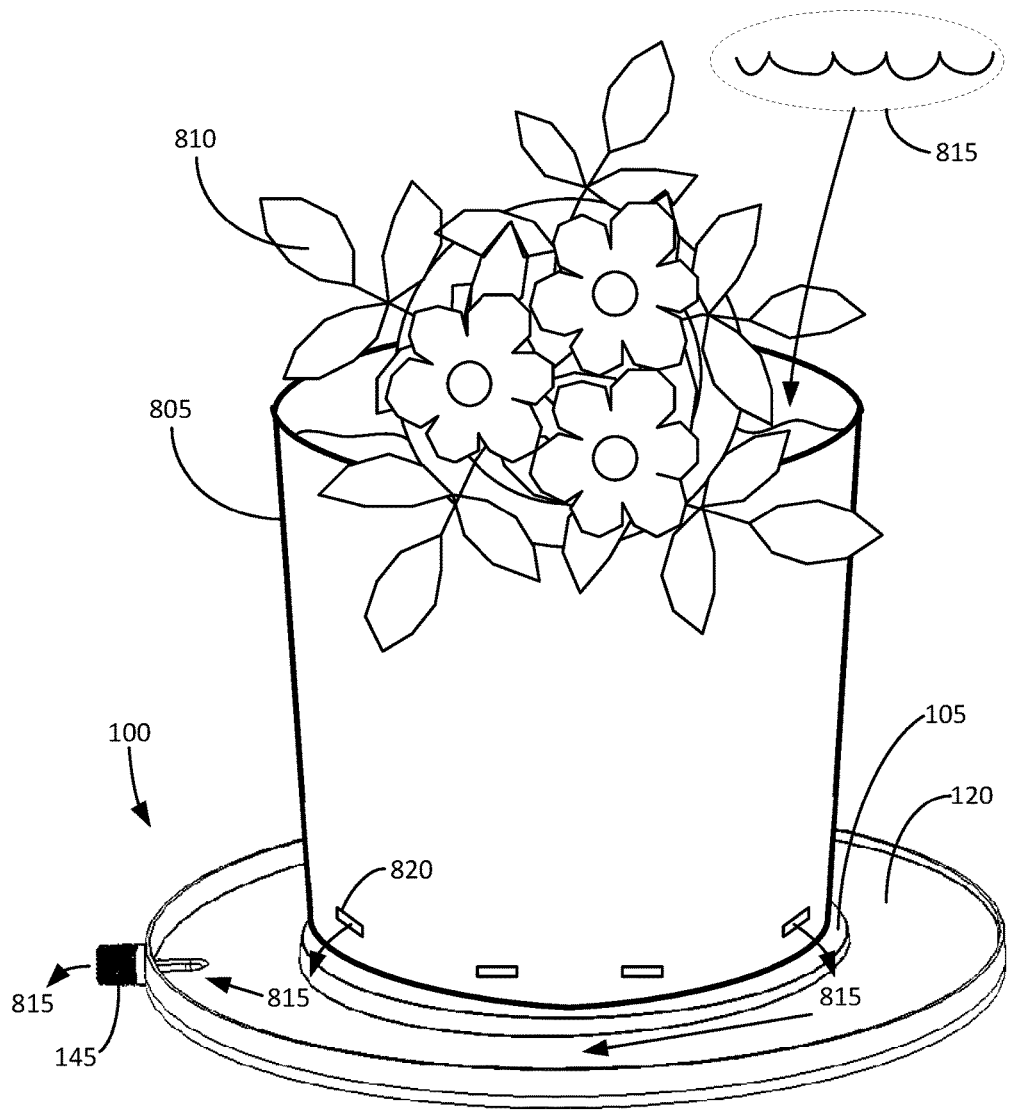
FIG. 8 illustrates another example perspective view showing an upper side of a planter pot drain tray with a potted plant thereon in accordance with various embodiments of the present inventive concept.

FIG. 8 illustrates another example perspective view showing an upper side of a planter pot drain tray 100 with a planter pot 805 thereon, and a potted plant 810 within the planter pot drain tray 100 in accordance with various embodiments of the present inventive concept. The elevated central pedestal member 105 provides a raised central section to elevate the planter pot 805 and associated plant 810 above a water drainage area. For example, the planter pot 805 can receive water 815. The water 815 can seep into the soil and roots of the plant 810. Some of the water 815, however, can escape through runoff apertures 820 in the planter pot 805. The water runoff 815 can follow the slope of the oblique liquid drain away member 120 around the elevated central pedestal member 105, and out through the drain spout member 145.

The planter pot drain tray 100 can be made of acrylonitrile butadiene styrene (ABS) plastic, metal, or any suitable composite material. The planter pot drain tray 100 can take various sizes to accommodate various sizes of planter pots.

Figure 9:
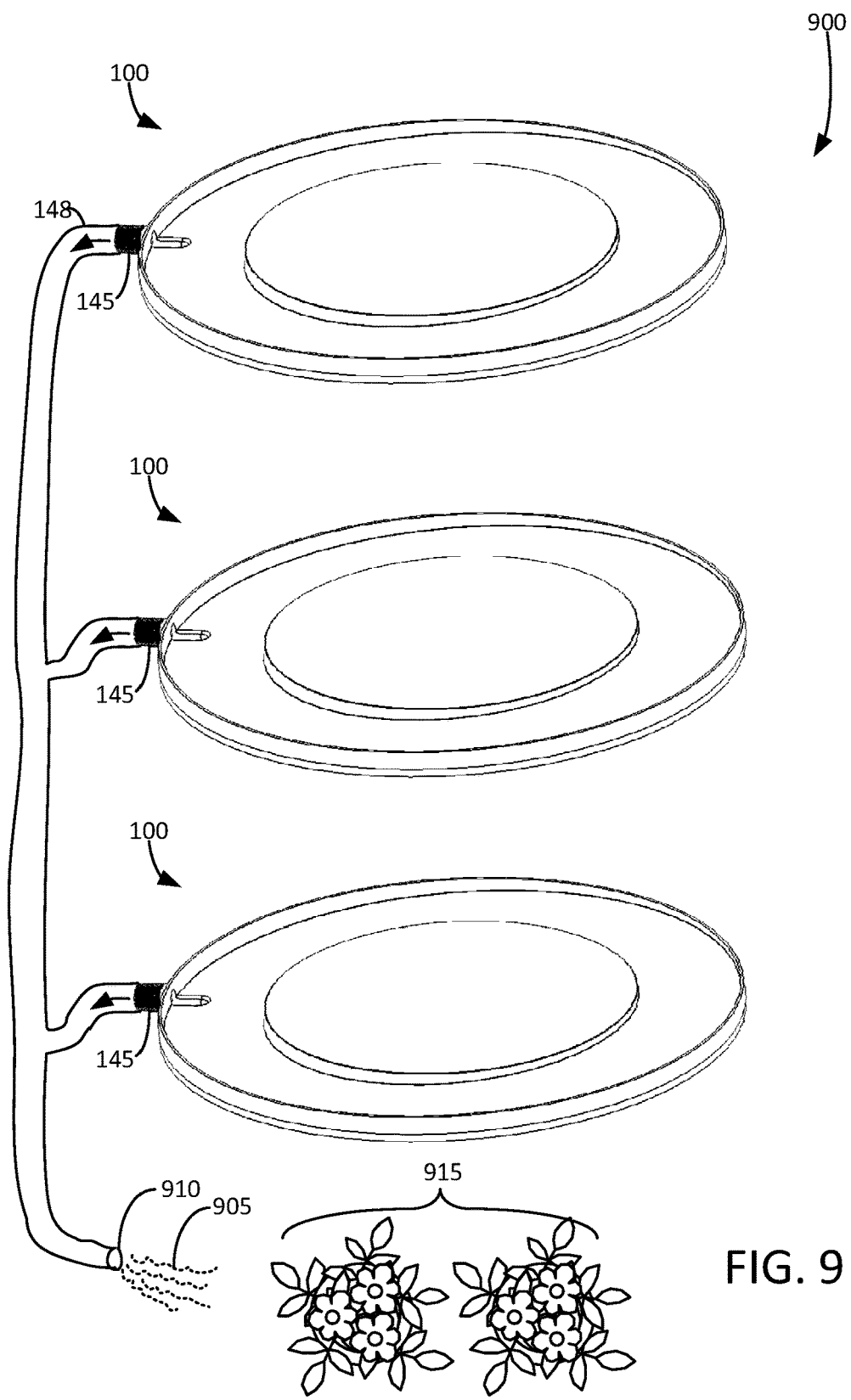
FIG. 9 illustrates an example system of multiple planter pot drain trays connected to each other in accordance with various embodiments of the present inventive concept.

FIG. 9 illustrates an example system 900 of multiple planter pot drain trays 100 connected to each other in accordance with various embodiments of the present inventive concept. In some embodiments, multiple planter pot drain trays 100 can be daisy-chained together or otherwise connected to each other by the water conduit 148, or by multiple water conduits such as multiple pipes or hoses, so that water runoff 905 from multiple planter pots can be combined and directed to a single exit point 910 from the water conduit 148. In some embodiments, 100% of the water runoff can be drained and/or re-directed to other plants 915.

Reference is now generally made to FIGS. 1 through 9.

In some embodiments, a planter pot drain tray 100 can include an elevated central pedestal member 105. The planter pot drain tray 100 can include an oblique liquid drain away member 120 surrounding the elevated central pedestal member 105. The oblique liquid drain away member 120 can include a high point at a first end 130 of the planter pot drain tray 100 and a low point at a second end 135 of the planter pot drain tray 100.

The planter pot drain tray 100 can include a flanged outer rim 110 coupled to an outer edge of the oblique liquid drain away member 120. The planter pot drain tray 100 can include a drain spout member 145 coupled to the flanged outer rim 110 at the low point of the oblique liquid drain away member 120 at the second end 135 of the planter pot drain tray 100.

The planter pot drain tray 100 can include a drain well 140 disposed in the oblique liquid drain away member 120 at the low point of the oblique liquid drain away member 120 at the second end 135 of the planter pot drain tray 100. The drain well 140 is coupled to the drain spout member 145. The elevated central pedestal member 105 can include one or more sidewalls 125. The one or more sidewalls 125 intersect with the oblique liquid drain away member 120. The one or more sidewalls 125 can include a first exposed height 155 above the oblique liquid drain away member 120 toward the first end 130 of the oblique liquid drain away member 120, and a second exposed height 150 above the oblique liquid drain away member 120 toward the second end 135 of the oblique liquid drain away member 120. The second exposed height 150 is greater than the first exposed height 155.

The oblique liquid drain away member 120 can be orientated obliquely relative to an upper horizontal planar surface 108 of the elevated central pedestal member 105. The elevated central pedestal member 105 is configured to elevate a planter pot 805 and associated plant 810 on the horizontal planar surface 108 above a water drainage area (e.g., 160 and 165).

The flanged outer rim 110 can contain water runoff 815 on the oblique liquid drain away member 120, and guide the water runoff 815 in tandem with the oblique liquid drain away member 120 toward and out of the drain spout member 145.

The planter pot drain tray 100 can include a drain well 140 disposed in the oblique liquid drain away member 120 at the low point of the oblique liquid drain away member 120 at the second end 135 of the planter pot drain tray 100. The drain well 140 is coupled to the drain spout member 145. The drain well 140 is configured to cause the water runoff 815 that congregates near the second end 135 of the planter pot drain tray 100 at a bottom region or lowest point of the oblique liquid drain away member 120 to travel into the drain spout member 145, away from the planter pot 805 and associated plant 810, and out of the planter pot drain tray 100.

The elevated central pedestal member 105, the oblique liquid drain away member 120, and the drain well 140 are configured to permit the water runoff 815 to be completely drained through the drain spout member 145. The planter pot drain tray 100 can include a water conduit 148 such as a pipe or hose connected to the drain spout member 145 to extend an exit point of the water runoff 815. The elevated central pedestal member 105 includes a substantially planar circular upper surface 108 and one or more sidewalls 125. In some embodiments, the elevated central pedestal member 105 is substantially cylindrical. The substantially planar circular upper surface 108 can be flush with top edges of the one or more sidewalls 125.

The planter pot drain tray 100 can include a first plurality of internal support beam members 175 disposed in the elevated central pedestal member 105 under the substantially planar circular upper surface 108, and coupled to an underside of the substantially planar circular upper surface 108. The planter pot drain tray 100 can include a second plurality of internal support beam members 180 disposed in the elevated central pedestal member 105 under the substantially planar circular upper surface 108, and coupled to the underside of the substantially planar circular upper surface 108. The first plurality of internal support beam members 175 can be arranged perpendicular to the second plurality of internal support beam members 180.

The planter pot drain tray 100 can include a plurality of support fin members 170 that are flush with a bottom edge of the one or more sidewalls 125 of the elevated central pedestal member 105. The plurality of support fin members 170 can extend below the flanged outer rim 110, and are configured to make contact with a ground level surface, or other suitable surface upon which the planter pot drain tray 100 may be placed. The plurality of support fin members 170 can be coupled to the oblique liquid drain away member 120 and to the one or more sidewalls 125 of the elevated central pedestal member 105.

In some embodiments, the flanged outer rim 110 is referred to as an upper flanged outer rim. The planter pot drain tray 100 can further include a lower flanged outer rim 115 coupled to the oblique liquid drain away member 120. The plurality of support fin members 170 can extend below the lower flanged outer rim 115.

The planter pot drain tray 100 can include a drain well 140 disposed in the oblique liquid drain away member 120 at the low point of the oblique liquid drain away member 120 at the second end 135 of the planter pot drain tray. In some embodiments, a diameter of the drain spout member 145 is less than a distance between an upper edge of the upper flanged outer rim 110 and a lower edge of the drain well 140. In some embodiments, the plurality of support fin members 170 extend below the drain well 140.

In some embodiments, a planter pot drain tray system 900 is provided. The planter pot drain tray system 900 can include a water conduit. The planter pot drain tray system 900 can include a first planter pot drain tray 100 including an elevated central pedestal member 105, an oblique liquid drain away member 120 surrounding the elevated central pedestal member 105, a flanged outer rim 110 coupled to an outer edge of the oblique liquid drain away member 120, and a drain spout member 145 coupled to the flanged outer rim 110.

The planter pot drain tray system 900 can include a second planter pot drain tray 100 including an elevated central pedestal member 105, an oblique liquid drain away member 120 surrounding the elevated central pedestal member 105, a flanged outer rim 110 coupled to an outer edge of the oblique liquid drain away member 120, and a drain spout member 145 coupled to the flanged outer rim 110.

In some embodiments, the drain spout member 145 of the first planter pot drain tray 100 is coupled to the water conduit 148, and the drain spout member 145 of the second planter pot drain tray 100 is coupled to the water conduit 148.

The planter pot drain tray system 900 can include a third planter pot drain tray 100 including an elevated central pedestal member 105, an oblique liquid drain away member 120 surrounding the elevated central pedestal member 105, a flanged outer rim 110 coupled to an outer edge of the oblique liquid drain away member 120, and a drain spout member 145 coupled to the flanged outer rim 110. The drain spout member 145 of the third planter pot drain tray 100 can be coupled to the water conduit 148.

In some embodiments, the oblique liquid drain away member 120 of each of the first, second, and third planter pot drain trays includes a high point at a first end 130 of the corresponding planter pot drain tray 100 and a low point at a second end 135 of the corresponding planter pot drain tray 100. The drain spout member 145 of each of the first, second, and third planter pot drain trays can be coupled to the flanged outer rim 110 of the corresponding planter pot drain tray 100 at the low point of the oblique liquid drain away member 120 at the second end 135 of the corresponding planter pot drain tray 100.

In some embodiments, water runoff 905 from the first, second, and third planter pot drain trays is combined and directed to a single exit point 910 from the water conduit 148 and re-directed to a drain or to plants 915 that are external relative to the first, second, and third planter pot drain trays 100.

In some embodiments, each of the first, second, and third planter pot drain trays 100 includes a drain well 140 disposed in the oblique liquid drain away member 120 of the corresponding planter pot drain tray 100 at the low point of the oblique liquid drain away member 120 at the second end 135 of the corresponding planter pot drain tray 100. The drain well 140 can be coupled to the drain spout member 145 of the corresponding planter pot drain tray 100. The elevated central pedestal member 105 of each of the first, second, and third planter pot drain trays 100 can includes one or more sidewalls 125. The one or more sidewalls 125 can intersect with the oblique liquid drain away member 120 of the corresponding planter pot drain tray 100.

In some embodiments, the one or more sidewalls 125 of each of the first, second, and third planter pot drain trays 100 include a first exposed height 155 above the oblique liquid drain away member 120 toward the first end 130 of the oblique liquid drain away member 120, and a second exposed height 150 above the oblique liquid drain away member 120 toward the second end 135 of the oblique liquid drain away member 120. The second exposed height 150 is greater than the first exposed height 155 for each of the first, second, and third planter pot drain trays 100.

In some embodiments, the oblique liquid drain away member 120 of each of the first, second, and third planter pot drain trays 100 is orientated obliquely relative to an upper horizontal planar surface 108 of the elevated central pedestal member 105 of the corresponding planter pot drain tray 100. The elevated central pedestal member 105 of each of the first, second, and third planter pot drain trays 100 is configured to elevate a planter pot 805 and associated plant 810 on the horizontal planar surface 108 above a corresponding water drainage area (e.g., 160 and 165).

In some embodiments, the flanged outer rim 110 of each of the first, second, and third planter pot drain trays 100 is configured to contain water runoff 815 on the corresponding oblique liquid drain away member 120, and to guide the water runoff 815 in tandem with the oblique liquid drain away member 120 toward and out of the drain spout member 145 of the corresponding planter pot drain tray 100. In some embodiments, each of the first, second, and third planter pot drain trays 100 further comprises a drain well 140 disposed in the corresponding oblique liquid drain away member 120 at the low point of the oblique liquid drain away member 120 at the second end 135 of the corresponding planter pot drain tray 100.

The drain well of each of each of the first, second, and third planter pot drain trays 100 can be coupled to the corresponding drain spout member 145. The drain well 140 of each of the first, second, and third planter pot drain trays 100 can cause the water runoff 815 that congregates near the second end 135 of the corresponding planter pot drain tray 100 at a bottom region or lowest point of the oblique liquid drain away member 120 to travel into the corresponding drain spout member 145, away from the corresponding planter pot 805 and associated plant 810, and out of the corresponding planter pot drain tray 100. The elevated central pedestal member 105 of each of the first, second, and third planter pot drain trays 100, the oblique liquid drain away member 120 of each of the first, second, and third planter pot drain trays 100, and the corresponding drain well 140 of each of the first, second, and third planter pot drain trays 100 are configured to permit the water runoff 815 to be completely drained through the drain spout member 145 of each of the first, second, and third planter pot drain trays 100.

Having described and illustrated the principles of the inventive concept with reference to illustrated embodiments, it will be recognized that the illustrated embodiments can be modified in arrangement and detail without departing from such principles, and can be combined in any desired manner And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the inventive concept to particular embodiment configurations. As used herein, these terms can reference the same or different embodiments that are combinable into other embodiments.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

The invention claimed is:

1. A planter pot drain tray, comprising:
an elevated central pedestal member;
an oblique liquid drain away member surrounding the elevated central pedestal member, wherein the oblique liquid drain away member includes a high point at a first end of the planter pot drain tray and a low point at a second end of the planter pot drain tray;
a flanged outer rim coupled to an outer edge of the oblique liquid drain away member; and
a drain spout member coupled to the flanged outer rim at the low point of the oblique liquid drain away member at the second end of the planter pot drain tray,
wherein:
the elevated central pedestal member includes one or more sidewalls;
the one or more sidewalls intersect with the oblique liquid drain away member;
the one or more sidewalls include a first exposed height above the oblique liquid drain away member toward the first end of the oblique liquid drain away member, and a second exposed height above the oblique liquid drain away member toward the second end of the oblique liquid drain away member; and
the second exposed height is greater than the first exposed height.

2. The planter pot drain tray of claim 1, further comprising:
a drain well disposed in the oblique liquid drain away member at the low point of the oblique liquid drain away member at the second end of the planter pot drain tray, wherein the drain well is coupled to the drain spout member.

3. The planter pot drain tray of claim 1, wherein:
the oblique liquid drain away member is orientated obliquely relative to an upper horizontal planar surface of the elevated central pedestal member; and
the elevated central pedestal member is configured to elevate a planter pot and associated plant on the horizontal planar surface above a water drainage area.

4. The planter pot drain tray of claim 3, wherein:
the flanged outer rim is configured to contain water runoff on the oblique liquid drain away member, and to guide the water runoff in tandem with the oblique liquid drain away member toward and out of the drain spout member.

5. The planter pot drain tray of claim 4, further comprising:
a drain well disposed in the oblique liquid drain away member at the low point of the oblique liquid drain away member at the second end of the planter pot drain tray, wherein:
the drain well is coupled to the drain spout member;
the drain well is configured to cause the water runoff that congregates near the second end of the planter pot drain tray at a bottom region or lowest point of the oblique liquid drain away member to travel into the drain spout member, away from the planter pot and associated plant, and out of the planter pot drain tray.

6. The planter pot drain tray of claim 5, wherein:
the elevated central pedestal member, the oblique liquid drain away member, and the drain well are configured to permit the water runoff to be completely drained through the drain spout member.

7. The planter pot drain tray of claim 1, further comprising a water conduit connected to the drain spout member to extend an exit point of the water runoff.

8. The planter pot drain tray of claim 1, wherein:
the elevated central pedestal member includes a substantially planar circular upper surface;
the elevated central pedestal member is substantially cylindrical; and
the substantially planar circular upper surface is flush with top edges of the one or more sidewalls.

9. The planter pot drain tray of claim 8, further comprising:
a first plurality of internal support beam members disposed in the elevated central pedestal member under the substantially planar circular upper surface, and coupled to the substantially planar circular upper surface; and
a second plurality of internal support beam members disposed in the elevated central pedestal member under the substantially planar circular upper surface, and coupled to the substantially planar circular upper surface,
wherein the first plurality of internal support beam members are arranged perpendicular to the second plurality of internal support beam members.

10. The planter pot drain tray of claim 9, further comprising:
a plurality of support fin members that are flush with a bottom edge of the one or more sidewalls of the elevated central pedestal member, wherein the plurality of support fin members extend below the flanged outer rim, and are configured to make contact with a ground level surface.

11. The planter pot drain tray of claim 10, wherein:
the plurality of support fin members are coupled to the oblique liquid drain away member and to the one or more sidewalls of the elevated central pedestal member.

12. The planter pot drain tray of claim 11, wherein the flanged outer rim is referred to as an upper flanged outer rim, the planter pot drain tray further comprising:
a lower flanged outer rim coupled to the oblique liquid drain away member, wherein the plurality of support fin members extend below the lower flanged outer rim.

13. The planter pot drain tray of claim 12, further comprising:
a drain well disposed in the oblique liquid drain away member at the low point of the oblique liquid drain away member at the second end of the planter pot drain tray, wherein:

a diameter of the drain spout member is less than a distance between an upper edge of the upper flanged outer rim and a lower edge of the drain well; and the plurality of support fin members extend below the drain well.

14. A planter pot drain tray system, comprising:

a water conduit;

a first planter pot drain tray including an elevated central pedestal member, an oblique liquid drain away member surrounding the elevated central pedestal member, a flanged outer rim coupled to an outer edge of the oblique liquid drain away member, and a drain spout member coupled to the flanged outer rim; and a second planter pot drain tray including an elevated central pedestal member, an oblique liquid drain away member surrounding the elevated central pedestal member, a flanged outer rim coupled to an outer edge of the oblique liquid drain away member, and a drain spout member coupled to the flanged outer rim, wherein:

the drain spout member of the first planter pot drain tray is coupled to the water conduit, and the drain spout member of the second planter pot drain tray is coupled to the water conduit;

the oblique liquid drain away member of each of the first and second planter pot drain trays includes a high point at a first end of the corresponding planter pot drain tray and a low point at a second end of the corresponding planter pot drain tray;

the elevated central pedestal member of each of the first and second planter pot drain trays includes one or more sidewalls;

the one or more sidewalls intersect with the oblique liquid drain away member of the corresponding planter pot drain tray;

the one or more sidewalls of each of the first and second planter pot drain trays include a first exposed height above the oblique liquid drain away member toward the first end of the oblique liquid drain away member, and a second exposed height above the oblique liquid drain away member toward the second end of the oblique liquid drain away member; and the second exposed height is greater than the first exposed height for each of the first and second planter pot drain trays.

15. The planter pot drain tray system of claim 14, further comprising:

a third planter pot drain tray including an elevated central pedestal member, an oblique liquid drain away member surrounding the elevated central pedestal member, a flanged outer rim coupled to an outer edge of the oblique liquid drain away member, and a drain spout member coupled to the flanged outer rim, wherein the drain spout member of the third planter pot drain tray is coupled to the water conduit.

16. The planter pot drain tray system of claim 15, wherein:

the oblique liquid drain away member of the third planter pot drain trays includes a high point at a first end of the third planter pot drain tray and a low point at a second end of the third planter pot drain tray; and the drain spout member of each of the first, second, and third planter pot drain trays is coupled to the flanged outer rim of the corresponding planter pot drain tray at the low point of the oblique liquid drain away member at the second end of the corresponding planter pot drain tray.

17. The planter pot drain tray system of claim 16, wherein:

water runoff from the first, second, and third planter pot drain trays is combined and directed to a single exit point from the water conduit and re-directed to at least one of a drain or plants that are external relative to the first, second, and third planter pot drain trays.

18. The planter pot drain tray system of claim 16, wherein each of the first, second, and third planter pot drain trays includes:

a drain well disposed in the oblique liquid drain away member of the corresponding planter pot drain tray at the low point of the oblique liquid drain away member at the second end of the corresponding planter pot drain tray, wherein:

the drain well is coupled to the drain spout member of the corresponding planter pot drain tray.

19. The planter pot drain tray system of claim 15, wherein:

the oblique liquid drain away member of each of the first, second, and third planter pot drain trays is orientated obliquely relative to an upper horizontal planar surface of the elevated central pedestal member of the corresponding planter pot drain tray;

the elevated central pedestal member of each of the first, second, and third planter pot drain trays is configured to elevate a planter pot and associated plant on the horizontal planar surface above a corresponding water drainage area;

the flanged outer rim of each of the first, second, and third planter pot drain trays is configured to contain water runoff on the corresponding oblique liquid drain away member, and to guide the water runoff in tandem with the oblique liquid drain away member toward and out of the drain spout member of the corresponding planter pot drain tray;

each of the first, second, and third planter pot drain trays further comprises a drain well disposed in the corresponding oblique liquid drain away member at the low point of the oblique liquid drain away member at the second end of the corresponding planter pot drain tray;

the drain well of each of each of the first, second, and third planter pot drain trays is coupled to the corresponding drain spout member;

the drain well of each of the first, second, and third planter pot drain trays is configured to cause the water runoff that congregates near the second end of the corresponding planter pot drain tray at a bottom region or lowest point of the oblique liquid drain away member to travel into the corresponding drain spout member, away from the corresponding planter pot and associated plant, and out of the corresponding planter pot drain tray; and the elevated central pedestal member of each of the first, second, and third planter pot drain trays, the oblique liquid drain away member of each of the first, second, and third planter pot drain trays, and the corresponding drain well of each of the first, second, and third planter pot drain trays are configured to permit the water runoff to be completely drained through the drain spout member of each of the first, second, and third planter pot drain trays.

* * * * *